US008793657B2

(12) United States Patent
Belisario et al.

(10) Patent No.: US 8,793,657 B2
(45) Date of Patent: Jul. 29, 2014

(54) VISUAL DEBUGGER FOR DYNAMIC XSL TRANSFORMATIONS

(75) Inventors: Ella Belisario, Toronto (CA); Gordon R. Chiu, Richmond Hill (CA); Erin Harris, Toronto (CA); Christina P. Lau, Scarborough (CA); Peter A. Nicholls, Toronto (CA); Ilene R. Seelemann, Thornhill (CA); Henry Zongaro, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 3088 days.

(21) Appl. No.: 11/284,172

(22) Filed: Nov. 21, 2005

(65) Prior Publication Data

US 2006/0129993 A1    Jun. 15, 2006

(30) Foreign Application Priority Data

Nov. 30, 2004  (CA) .................................... 2488678

(51) Int. Cl.
*G06F 9/44*  (2006.01)
(52) U.S. Cl.
USPC .......................................... 717/125; 717/124
(58) Field of Classification Search
USPC ................................................. 717/124, 125
See application file for complete search history.

(56) References Cited

U.S. PATENT DOCUMENTS

| | | | |
|---|---|---|---|
| 5,533,192 A * | 7/1996 | Hawley et al. ................... | 714/28 |
| 5,675,730 A | 10/1997 | Perdue et al. | |
| 6,275,956 B1 | 8/2001 | On et al. | |
| 6,732,330 B1 | 5/2004 | Claussen et al. | |
| 7,124,404 B1 * | 10/2006 | Bebout et al. .................. | 717/127 |
| 7,127,705 B2 * | 10/2006 | Christfort et al. ............. | 717/113 |
| 7,353,498 B2 * | 4/2008 | Gupta et al. ................... | 717/125 |
| 2002/0087952 A1 | 7/2002 | Tabe et al. | |
| 2002/0178170 A1 * | 11/2002 | Britton et al. ................. | 707/100 |
| 2003/0005416 A1 * | 1/2003 | Henftling et al. ............. | 717/129 |
| 2003/0014738 A1 | 1/2003 | Dawkins et al. | |
| 2003/0079159 A1 * | 4/2003 | Ten-Hove et al. .............. | 714/34 |
| 2004/0117769 A1 * | 6/2004 | Lauzon et al. ................. | 717/125 |
| 2006/0048098 A1 * | 3/2006 | Gatlin et al. ................... | 717/124 |

OTHER PUBLICATIONS

Stylus Studio (World class XML/XSLT tools and resources, URL:http://198.77.237.242/productinfo.asp?page=6, retrieved on Jan. 16, 2002).*
Manne et al. (Automating the Debugging of Large Numerical Codes, Modern software tools for scientific computing, 1997, pp. 339-352).*
Stylus Studio (XSLT Debugger, URL: http://web.archive.org/web/20040622033045/www.stylusstudio.com/xslt_debugger, dated Jun. 22, 2004, retrieved on Oct. 15, 2009).*
Microsoft Computer Dictionary, Fifth Edition, 2002, p. 213.*

\* cited by examiner

*Primary Examiner* — Li B Zhen
*Assistant Examiner* — Hang Pan
(74) *Attorney, Agent, or Firm* — Steven L. Nichols; Van Cott, Bagley, Cornwall & McCarthy P.C.

(57) ABSTRACT

The present invention provides a visual debugger for dynamic XLS transformations. A method for real time debugging of mixed Java and Extensible Stylesheet Language Transform (XSLT) code comprises sending debug events from Java and XSLT debug sub-adapters to a debug super adapter, filtering the debug events received from the Java and XSLT debug sub-adapters, generating debug events representing a consolidated view of the received debug events, and sending the debug events to a debug user interface (UI).

20 Claims, 10 Drawing Sheets

VISUAL DEBUGGER FOR DYNAMIC XSL TRANSFORMATIONS

BACKGROUND OF THE INVENTION

The present invention generally relates to Extensible Stylesheet Language Transform (XSLT) stylesheets, and more particularly, to a visual debugger for dynamic XLS transformations.

The general flow of an XSL transformation 100 is illustrated in FIG. 1. As shown, an XSLT processor 102 reads both an Extensible Markup Language (XML) source document 104 and an XSLT stylesheet 106. Based on the instructions in the XSLT stylesheet 106, the XSLT processor 102 outputs a new XML, HyperText Markup Language (HTML), or text result document 108. In general, the XSLT stylesheet 106 specifies the transformations that need to be made to the XML source document 104 to produce the result document 108.

Developing XSLT stylesheets 106 can be complicated and error-prone due to the declarative and recursive nature of the XSLT language and other factors. Typically, the XSLT processor 102 provides as output only the result document 108 and no other useful information. If the result document 108 does not turn out as desired, the developer may not be able to determine what part of the XSLT stylesheet 106 produced the undesired results given only the result document 108, the XML source document 104, and the XSLT stylesheet 106. Visual debuggers may be used to debug XSL transformations.

The dynamic generation of XML is typically done using a Java servlet and invoking an XSLT processor to: respond to requests for XML source documents; and transform the XML source documents into HTML using an XSLT stylesheet. Consider, for example, the invocation of a simple XSLT transformation from input stream to output stream that can occur in a typical Web application, normally found inside a servlet:

```
java.net.URL urlXSL = new java.net.URL(xslID);
java.net.URL urlXML = new java.net.URL(sourceID);
// Create a transform factory instance.
javax.xml.transform.TransformerFactory tfactory =
javax.xml.transform.TransformerFactory.newInstance( );
javax.xml.transform.stream.StreamSource xslSource = new
javax.xml.transform.stream.StreamSource(urlXSL.openStream( ));
// for URI resolution
xslSource.setSystemId(xslID);
// Create a transformer for the stylesheet.
javax.xml.transform.Transformer transformer =
tfactory.newTransformer(xslSource);
javax.xml.transform.stream.StreamSource xmlSource = new
javax.xml.transform.stream.StreamSource(urlXML.openStream( ));
// for URI resolution
xmlSource.setSystemId(sourceID);
// Transform the source XML to System.out.
transformer.transform(xmlSource, new
javax.xml.transform.stream.StreamResult(System.out));
```

Using known Java debuggers, a user is able to step through the servlet and into the XSL transformation (provided it is written in Java).

BRIEF SUMMARY OF THE INVENTION

According to a one aspect of the present invention, a method for debugging of mixed Java and Extensible Stylesheet Language Transform (XSLT) code comprises sending debug events from a Java debug sub-adapter and a XSLT debug sub-adapter to a debug super adapter, filtering the debug events received from the Java and XSLT debug sub-adapters, generating debug events representing a consolidated view of the received debug events, and sending the debug events to a debug user interface (UI).

According to another aspect of the present invention, a method comprises debugging an Extensible Stylesheet Language (XSL) transformation in real time.

According to yet another aspect of the present invention, a system for debugging of mixed Java and Extensible Stylesheet Language Transform (XSLT) code comprises a Java debug sub-adapter and an XSLT sub-adapter, a debug super adapter for receiving debug events sent from the Java and XSLT debug sub-adapters, wherein the debug super adapter filters the debug events received from the Java and XSLT debug sub-adapters and generates debug events representing a consolidated view of the received debug events, and a debug user interface (UI) for receiving the debug events generated by the debug super adapter.

According a still further aspect of the present invention, a computer program product for debugging of mixed Java and Extensible Stylesheet Language Transform (XSLT) code comprises a computer usable medium having computer useable program code embodied therein. The computer useable program code comprises computer usable program code configured to send debug events from a Java debug sub-adapter and a XSLT debug sub-adapters to a debug super adapter, computer usable program code configured to filter the debug events received from the Java and XSLT debug sub-adapters, computer usable program code configured to generate debug events representing a consolidated view of the received debug events, and computer usable program code configured to send the debug events to a debug user interface (UI).

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
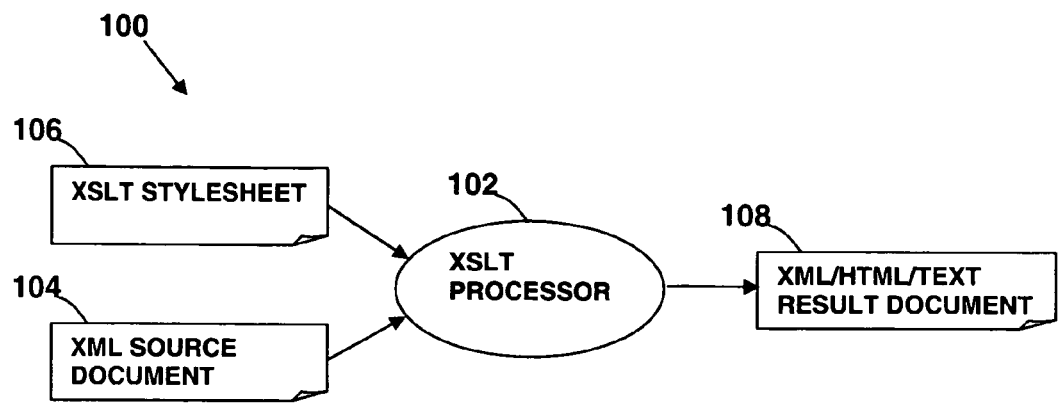
FIG. 1 depicts the general flow of an XSL transformation.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
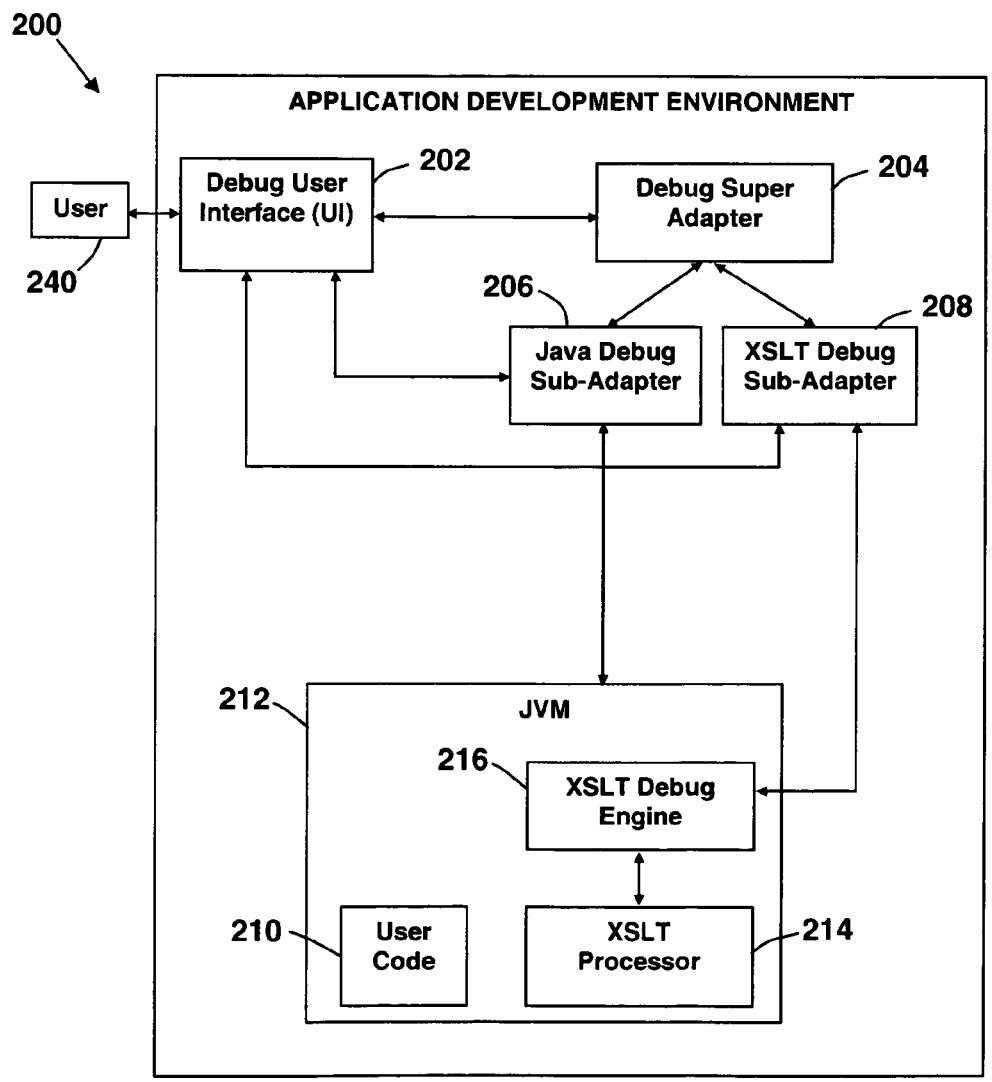
FIG. 2 depicts an application development environment in accordance with an embodiment of the present invention.

FIG. 2 depicts an application development environment 200 for providing visual debugging of dynamic XLS transformations in accordance with an embodiment of the present invention. In general, application development environment 200 comprises a debug user interface (debug UI) 202, a debug super-adapter 204, and a plurality of debug sub-adapters. In this embodiment, wherein the user code 210 to be debugged includes mixed calls to Java and XSLT, application development environment 200 includes a Java debug sub-adapter 206 and an XSLT debug sub-adapter 208. The user code 210 to be debugged runs in a Java Virtual Machine (JVM) 212. An XSLT processor 214 (e.g., XALAN) and an XSLT debug engine 216 also run in JVM 212. The XSLT debug engine 216 is used by the XSLT debug sub-adapter 208 to debug XSLT code, while the JVM 212 is used by the Java sub-adapter 206 to debug Java code. The debug super adapter 204 is configured to receive/obtain information (e.g., debug events, stack frames, variables, etc.) from the Java and XSLT debug sub-adapters 206, 208, and to create a unified view for the user 240, which allows the user 240 to step between code requiring different debug sub-adapters, view a merged stack trace, and select each stack frame and view its variables and source. The debug super adapter 204 can also ask the Java and XSLT debug sub-adapters 206, 208 to set breakpoints.

Figure 3:
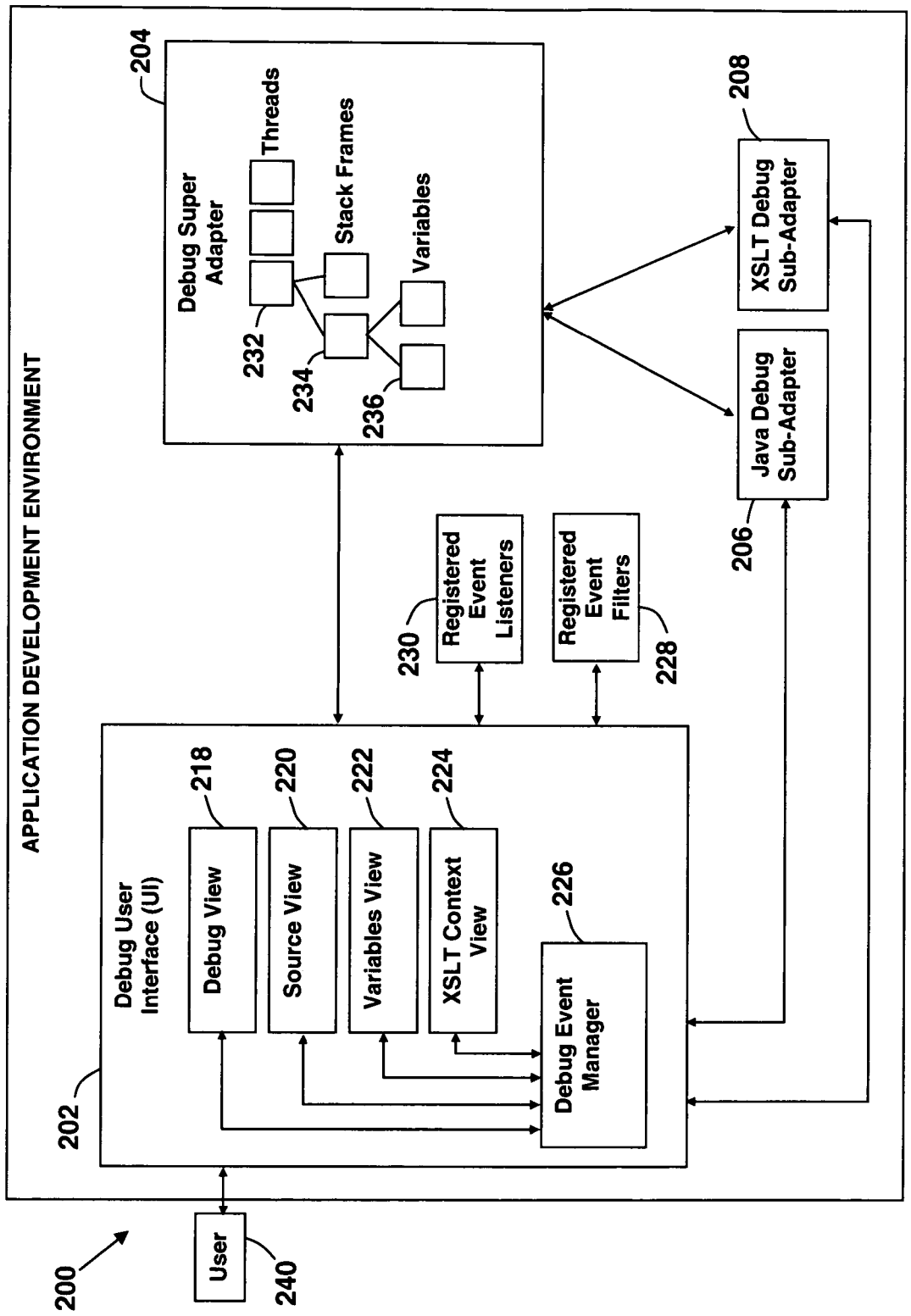
FIG. 3 depicts a portion of the application development environment of FIG. 2 in greater detail.

A more detailed view of the debug UI 202 and debug super adapter 204 in accordance with an embodiment of the present invention is provided in FIG. 3. As shown, the debug UI 202 is configured to provide a user 240 with a plurality of different views, including a debug view 218, source view 220, variable view 222, and XSLT context view 224. (See also FIGS. 5-7).

The debug UI 202 also includes a debug event manager 226. The debug event manager 226 is configured to receive debug events from the debug super-adapter 204 and from the Java and XSLT debug sub-adapters 206, 208, and to send the debug events to registered event filters 228 (which include the debug super adapter 204). The debug event manager 226 queries the registered event filters 228 asking them if they want to filter a current debug event. The debug event manager 226 does not make any filtering decisions itself, it just accepts the decisions made by the registered event filters 228 and acts on them (if filtered, do not pass the debug event to the appropriate registered event listeners 230, if not filtered, then pass on the debug event to the appropriate registered event listeners 230).

The debug super adapter 204 includes threads 232, stack frames 234, and variables 236. Although not shown for clarity, the Java and XSLT debug sub-adapters 206, 208 also includes threads, stack frames, and variables.

Each registered listener 230 can obtain additional information from a debug event source (e.g., debug super adapter 204, Java debug sub-adapter 206 or XSLT debug sub-adapter 208). This may include, for example, asking a thread 232 for its stack frames 234, stack frames 234 for their variables 236, etc.

Figure 4:
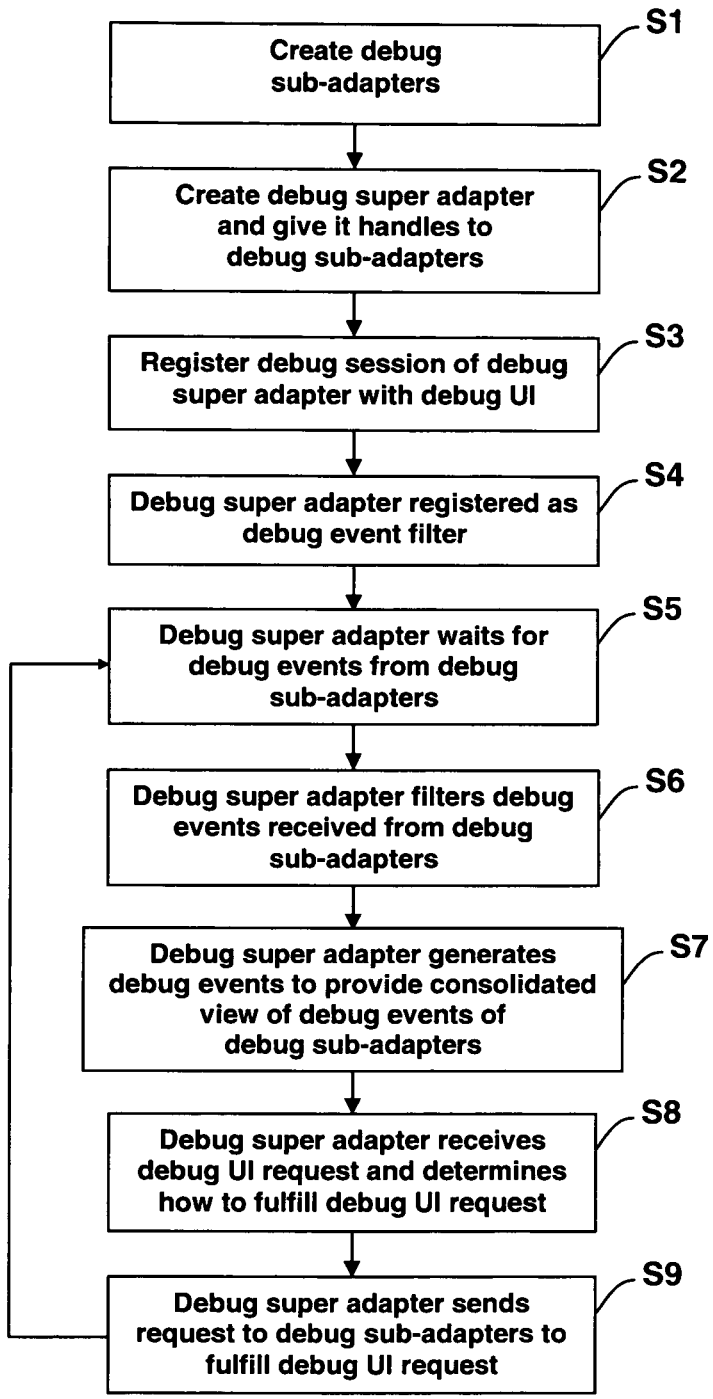
FIG. 4 depicts a flow diagram illustrating the general operation of the debug super adapter in accordance with an embodiment of the present invention.

A flow diagram illustrating the general operation of the debug super adapter 204 in accordance with an embodiment of the present invention is illustrated in FIG. 4, with reference to the corresponding components in FIGS. 2 and 3. In step S1, the Java and XSLT debug sub-adapters 206, 208 are created (through a launch mechanism not described herein). In step S2, the debug super adapter 204 is created (again through a launch mechanism) and is given handles to the Java and XSLT debug sub-adapters 206, 208 created in step S1. In step S3, the debug session of the debug super adapter 204 is registered with the debug UI 202. The Java and XSLT debug sub-adapters 206, 208 are not registered. This is so that only one debug session is seen by the user 240. In step S4, the debug super adapter 204 registers itself as a debug event filter 228. In step S5, the debug super adapter 204 waits for a debug events (e.g., step end event, breakpoint event, terminate event, etc.) from the Java and XSLT debug sub-adapters 206, 208. In step S6, the debug super adapter 204 filters the received debug events. In step S7, the debug super adapter 204 uses information in received debug events and other information received from the debug sub-adapters 206, 208 to generate its own debug events and information, which provide a consolidated view of the debug events of the debug sub-adapters 206, 208. In step S8, after receiving a request from the debug UI 202, the debug super adapter 204 determines what it needs the debug sub-adapters 206, 208 to do in order to fulfill the debug UI 202 request. In step S9, the debug super adapter 204 sends its own requests to the debug sub-adapters 206, 208 to fulfill the debug UI 202 request. The debug super adapter 204 uses existing interfaces to control the Java and XSLT debug sub-adapters 206, 206. Such interfaces may include, for example, running, stepping, suspending threads and processes, setting breakpoints, etc. Flow then returns to step S5.

A detailed example of the operation of the present invention is presented below. The debug scenario in this example is a Java class that calls an XSL transform. The XSL transform also makes Java extension calls. The user code 210 (FIG. 2) in this example comprises:

```
Main Java Source:
import javax.xml.transform.stream.StreamResult;
import javax.xml.transform.stream.StreamSource;
public class Main {
    public static void main(String[ ] args) {
        try {
            TransformerFactory tFactory =
            TransformerFactory.newInstance( );
            Transformer transformer = tFactory.newTransformer(new
            StreamSource("values.xsl"));
            transformer.transform(new StreamSource("values.xml"), new
            StreamResult(System.out));
        } catch (Exception e) {
            e.printStackTrace( );
        }
    }
}
XSL Source:
<?xml version="1.0"?>
<xsl:stylesheet xmlns:xsl="http://www.w3.org/1999/XSL/Transform"
        xmlns:xalan="http://xml.apache.org/xalan"
        xmlns:factorial="xalan://Factorial"
        version="1.0">
<xsl:template match="doc">
<doc>
  <xsl:apply-templates/>
</doc>
</xsl:template>
<xsl:template match="factorial">
  <xsl:variable name="Value" select="text( )"/>
  <xsl:variable name="Result" select="factorial:compute($Value)"/>
  Factorial for <xsl:value-of select="$Value"/> =
  <xsl:value-of select="$Result"/>
</xsl:template>
</xsl:stylesheet>
Java Extension Source:
public class Factorial {
```

-continued

```
public static int compute(int value) {
    int result = 1;
    for(int i = value; i > 0; i--) {
        result = result * i;
    }
    return result;
}
}
```

Figure 5:
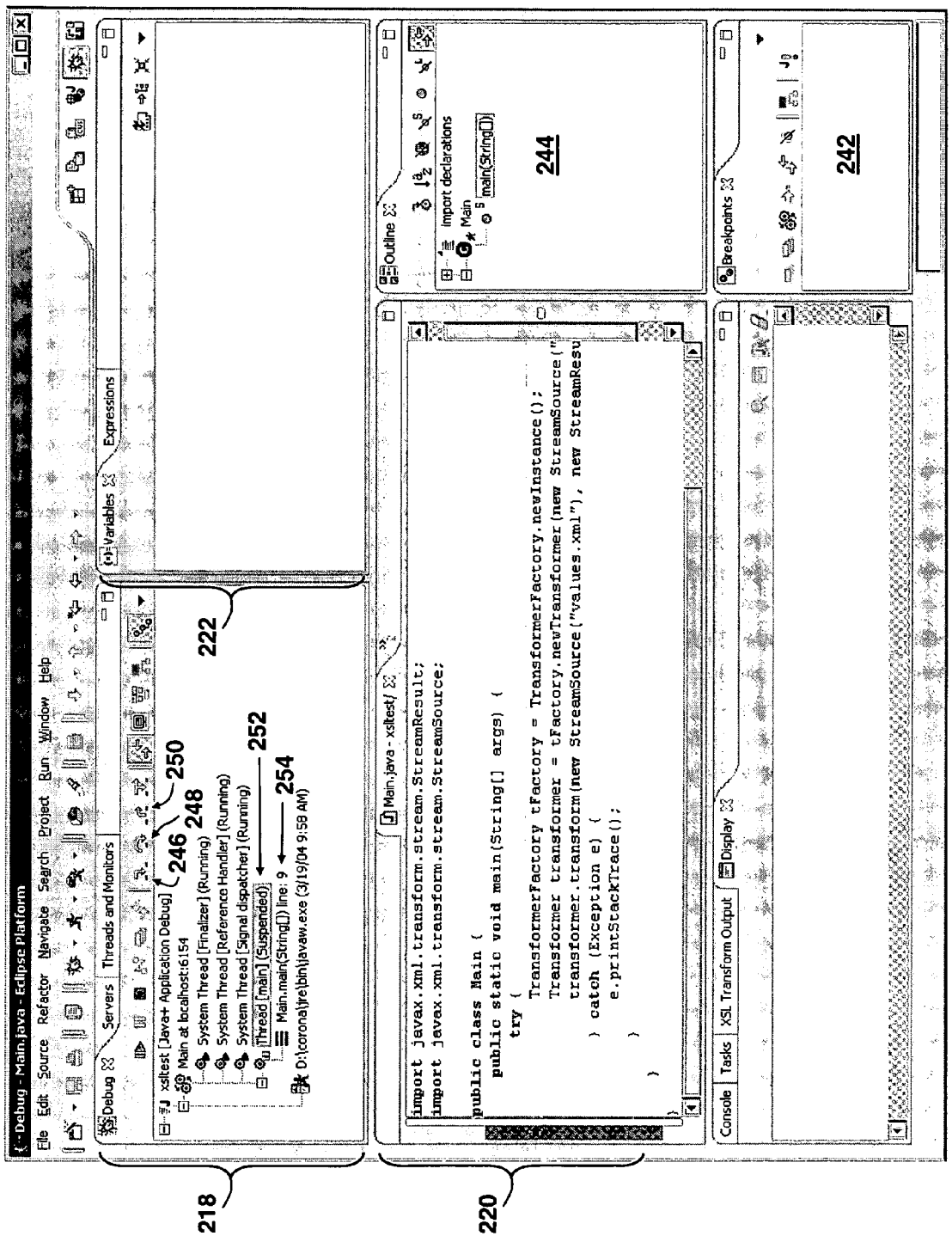
FIGS. 5-7 depict a debug user interface in accordance with an embodiment of the present invention.
Figure 6:
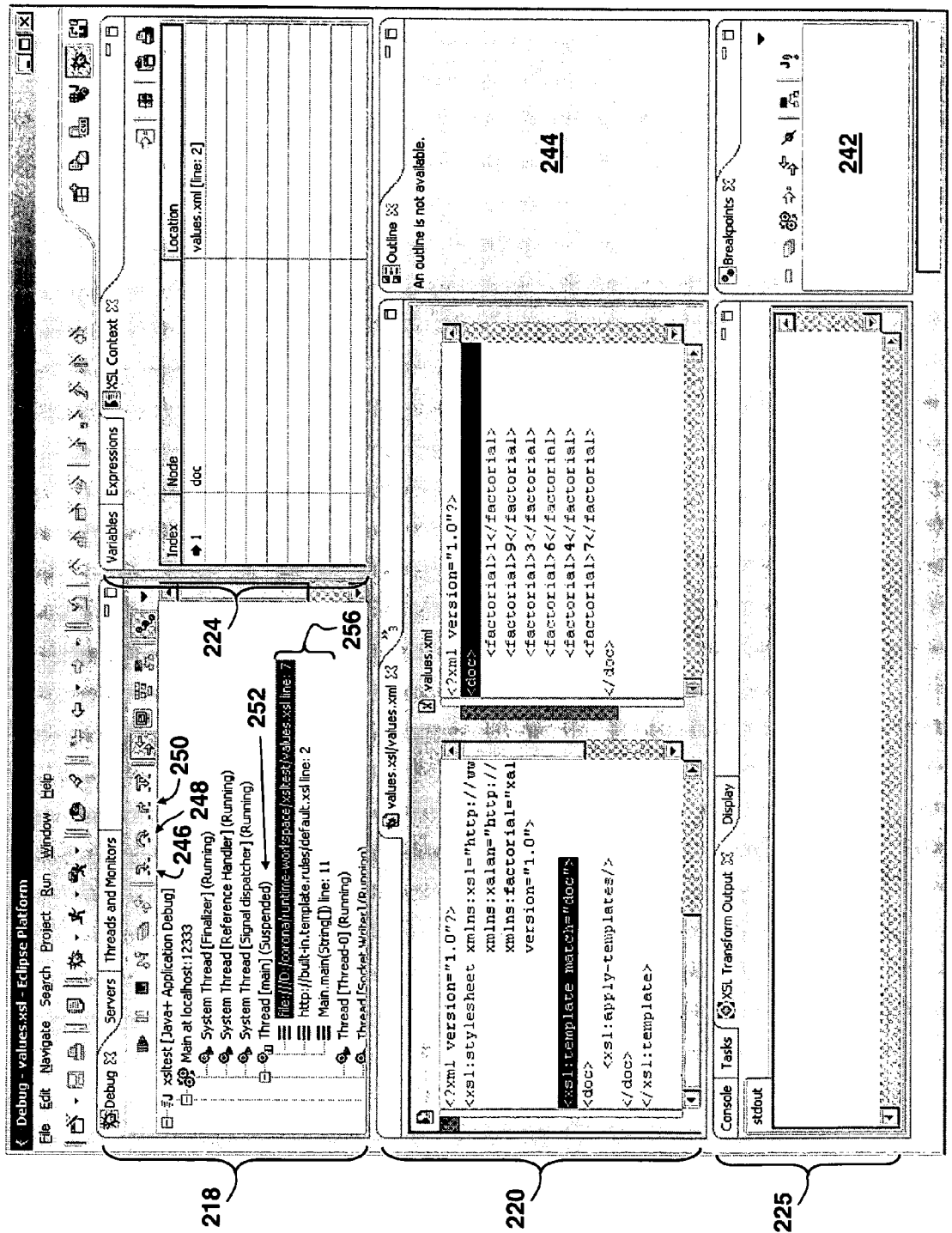
Figure 7:
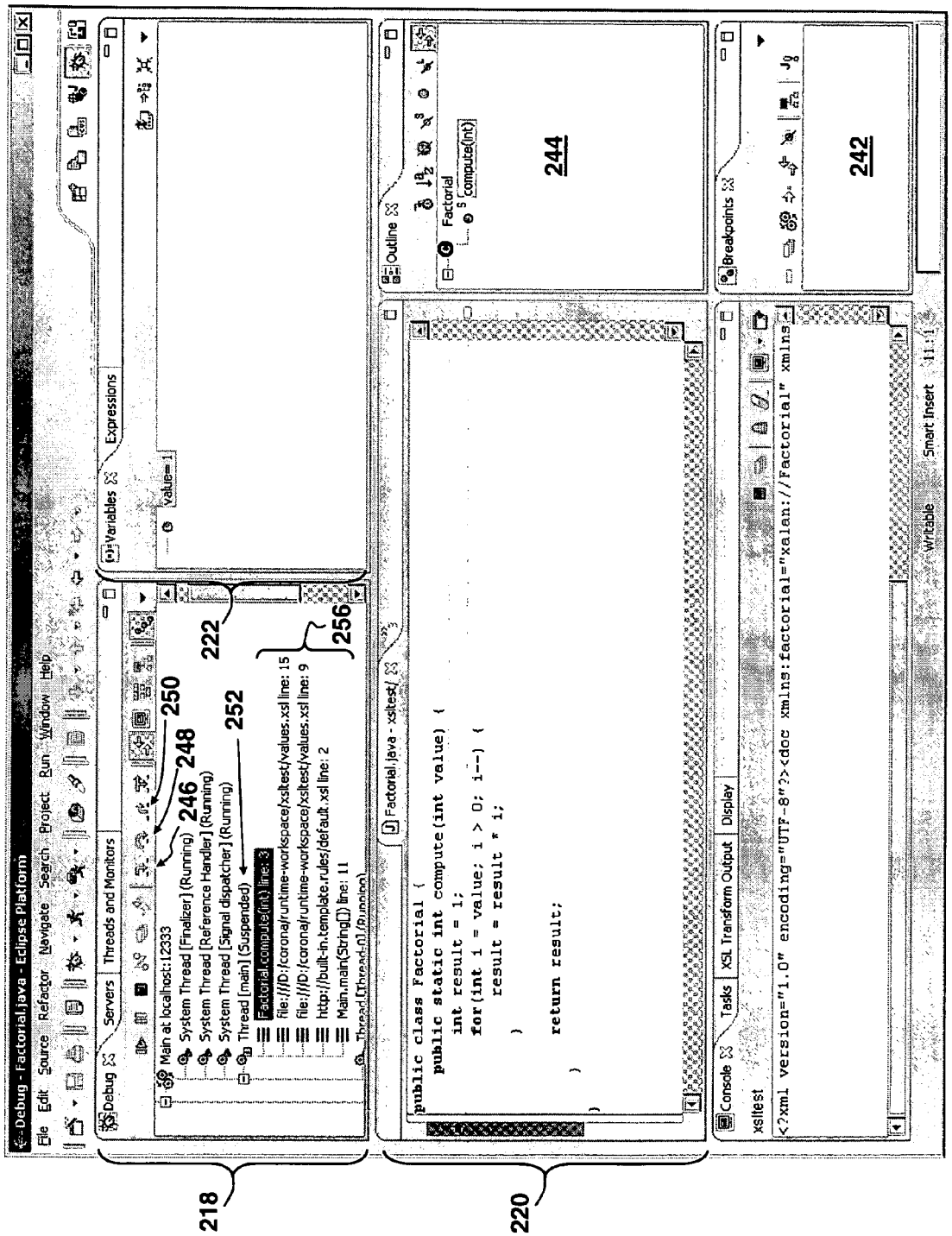

As depicted in FIGS. 5-7, several different views can be provided by the debug UI 202, including a debug (session) view 218, a source view 220, a variables view 222, and an XSLT context view 224. Other views commonly used in debugging, such as a breakpoint view 242, outline view 244, etc., are also provided by the debug UI 202. Numerous command/action buttons are also provided by the debug UI, including a step into button 246, step over button 248, and step return button 250. As known in the art, if the current line being debugged is a simple statement, the step into command executes the statement. If the current line is a function or method call, the step into command steps into the call and stops on the first line of the called function or method. The step over command executes the currently-selected line or statement and suspends on the next executable line or statement. The current line executes, without stopping in any functions (unless a breakpoint is set) called within the line, causing the current line to be stepped over. The step return command executes from the current execution point up to the line immediately following the line that called this function. This option stops execution after exiting the current function.

The user 240 initially creates a Java launch configuration for the class Main and launches it. The launcher (not shown) launches the JVM 212 with the Main class and creates a Java debug sub-adapter 206, which listens for the JVM 212 to connect, and an XSLT debug sub-adapter 208, which listens for the XSLT debug engine 216 to connect. The launcher then creates the debug super adapter 204 and passes the debug super adapter 204 handles to the Java debug sub-adapter 206 and the XSLT debug sub-adapter 208. Next, the debug super adapter 204 registers itself as a debug event filter 228. The debug super adapter 204 also sets an entry/exit mode on the XSLT debug sub-adapter 208. This tells the XSLT debug sub-adapter 208 to send special debug events for XSL transform entry and exit as well as debug events for calling an extension (e.g., a Java extension) and returning from an extension call. The JVM 212 then connects to the Java debug sub-adapter 206, and the Java debug sub-adapter 206 fires thread create events. The debug super adapter 204 filters the thread create events. For each Java thread, the debug super adapter 204 creates a wrapper thread and then fires a thread create event to the debug UI 202 for the wrapper threads. A suspend event is fired by the Java debug adapter 206 when the first line of the main( ) method is hit. The debug super adapter 204 filters the event and fires a suspend event for the corresponding wrapper thread. The debug UI 202 asks the thread that fired the event for its stack frames. In response, the debug super adapter 204 asks the Java debug sub-adapter 206 for its stack frames, creates wrapper stack frames for each Java stack frame and returns the frames to the debug UI 202. At this point the debug UI 202 appears as shown in FIG. 5. The debug view 218 in FIG. 5 shows the suspended thread 252 and its stack frame 254. The main Java source is displayed in the source view 220.

The user 240 next actuates the step over button 248 in the debug UI 202. In response, the debug UI 202 tells the wrapper thread to step over. The debug super adapter 204 sends a resume event to the debug UI 202 and tells the corresponding Java thread to step over. The Java debug sub-adapter 206 performs the step over and fires a step end event. The process for the step end suspend event is the same as for the suspend event when the first line of the main( ) method was hit.

At this point in the process, the user 240 is suspended on the line in the Java source: transformer.transform(new StreamSource("values.xml"), new StreamResult(System.out)). The user 240 next actuates the step into button 246 in the debug UI 202. The debug UI 202 asks the thread to do a step into. The debug super adapter 204 queries the XSLT debug sub-adapter 208 and asks it for its runtime packages. These are the names of the packages of the XSLT runtime. The debug super adapter 204 then tells the Java debug sub-adapter 206 to filter these packages when stepping. The debug super adapter 204 next tells the Java thread to do a step into. The XSLT debug engine 216 connects to the XSLT debug sub-adapter 208, and the XSLT debug sub-adapter 208 fires a thread create event. The debug super adapter 204 filters the event and creates a new wrapper thread for the XSLT thread. The debug super adapter 204 asks the XSLT thread what Java thread it is running on. The XSLT thread returns the Java thread name and Java thread group name. The debug super adapter 204 registers the XSLT wrapper thread with the corresponding Java wrapper thread. The Java wrapper thread keeps a stack of threads that are associated with it. The debug super adapter 204 does not fire a thread create event since it only wants the Java threads to be displayed in the debug UI 202. The XSLT debug sub-adapter 208 fires a suspend entry event. The debug super adapter 204 filters the event. The debug super adapter 204 then gets the Java thread associated with the XSLT thread and tells the Java thread to suspend. In response, the Java debug sub-adapter 206 sends a suspend event. The debug super adapter 204 filters the Java suspend event and fires a step end suspend event for its Java wrapper thread. The debug UI 202 asks the thread for its stack frames. The debug super adapter 204 asks the Java thread and the XSLT thread for their stack frames. The debug super adapter 204 also asks the XSLT thread for its entry points (classes or packages that are entry points into the XSLT runtime). The debug super adapter 204 uses the entry points to slot (i.e., merge) the XSLT stack frames into the Java stack frames throwing away any Java stack frames associated with the XSLT runtime, which the user typically does not want to see. The debug super adapter 204 then returns the merged stack frames 256 to the debug UI (note that the XSLT stack frame is now the top stack frame). At this point in the process, the debug UI 202 appears as shown in FIG. 6 (note that a stack frame for the built-in template rule is also shown since it matches "/"—the debugger will automatically skip built-in rules when stepping as specified by the user in a preference setting, it still shows them on the stack, however, so the user sees the true sequence of template rules). Also shown in FIG. 6 is the XSLT source in the source view 220, and the current node list and node in the XSLT context view 224. At this point in the process, the user 240 is suspended on the line in the XSLT source: <xsl:template match="doc">.

The user 240 next actuates the step over button 248 in the debug UI 202, and the debug UI 202 asks the thread to step over. The debug super adapter 204 knows that it is currently suspended in XSLT. To this extent, the debug super adapter 204 sends a resume event and tells the Java thread to resume and the XSLT thread to do a step over. The XSL thread performs the step over and sends a suspend event. The steps for the suspend event are similar to those above when the XSLT debug sub-adapter 208 sent the entry suspend event.

The user 240, currently suspended on the line <xsl:variable name="Result" select="factorial:compute($Value)"/>) in the XSLT source, then actuates the step into button 246 in the debug UI 202. The debug super adapter 204 sends a resume event to the debug UI 202 and tells the Java thread to resume and the XSLT thread to do a step into. The XSLT thread sends an extension call suspend event. The debug super adapter 204 filters the event and asks the XSLT thread for the extension entry point (the Java method that will be called). The debug super adapter 204 sets a hidden breakpoint in the Java debug sub-adapter 206 for the Java method that will be called. The debug super adapter 204 then tells the XSLT thread to resume. No events are sent to the debug UI 202. The Java thread sends a breakpoint suspend event. The debug super adapter 204 filters the event and sends a step end suspend event to the debug UI 202 (note that the user 240 requested a step into, hence the step end event). The debug UI 202 asks the thread for its stack frames. In response, the debug super adapter 204 asks the Java thread and the XSLT thread for their stack frames. The debug super adapter 204 uses the XSLT entry points as well the extension entry point to slot (i.e., merge) the XSLT stack frames into the Java stack frames and returns the merged stack frames 256 to the debug UI 202 (note that the Java extension stack frame is now the top stack frame). At this point in the process, the debug UI 202 appears as shown in FIG. 7, with the main Java source displayed in the source view 220. It should be noted from FIG. 7 that the merged stack frames 256 only show the user 240 information needed for the actual debugging of the user code 21, and that information (e.g., stack frames) for the underlying processes (e.g., XSLT runtime, XSLT threads, Java threads, etc.) is not displayed.

The user 240 actuates the step return button 250 in the debug UI 202. The debug super adapter 204 sends a resume event and tells the Java thread to resume. The XSLT thread fires a return from extension call event. The debug super adapter 204 filters the event and then suspends as it did before when stepping within XSLT.

The user 240 actuates the step return button 250 in the debug UI 202. The debug super adapter 204 sends a resume event and tells the Java thread to resume and the XSLT thread to step return. The XSLT thread fires an exit suspend event. The debug super adapter 204 removes the XSLT thread from the list of threads associated with the Java thread. The debug super adapter 204 then tells the Java thread to suspend. The debug super adapter 204 sets step filters on the Java thread to the XSLT runtime classes and tells the Java thread to step return. The debug super adapter 204 also tells the XSLT thread to resume. The Java thread sends a step end suspend event when it steps back to a frame that is not filtered. The debug super adapter 204 handles the event just as it did when the user was stepping within Java.

The debug UI 202 shows a full stack view for the XSL transform. This way the user 240 can click on lower stack frames and examine state for that stack frame in order to determine what is happening. A new stack frame is added whenever the current node list changes (see XSL Transformations (XSLT) Specification Version 1.0—Introduction for an explanation of "current node" and "current node list"). The current node list changes whenever the user 240 steps into an apply-templates, call-template, or for-each statement. Thus, if the user 240 sets a breakpoint in their transform at the point where they see the symptoms of a problem, when the breakpoint is hit they can click on the lower stack frames to find the cause of the problem.

Transforms that are called in Java may have either source or input (or both) that are in document object model (DOM) or Simple API for XML (SAX) format rather than being read from a file. Thus, there is no source file to display to the user 240. The XSLT debug sub-adapter 208 handles this by asking the XSLT debug engine 216 for the generated source file. The XSLT debug engine 216 serializes the XSLT source or XML input and sends the serialized source back to the XSLT debug sub-adapter 208. The XSLT debug sub-adapter 208 writes the source to a temporary file so the editor can display it like it would any other source.

The user can also launch a standalone transform by creating an XSLT launch configuration and specifying the XSLT source and XML input files. In response, the launcher will start the Java debug sub-adapter 206, XSLT debug sub-adapter 208, and debug super adapter 204 as before. Thus, if there are any Java extension calls in the XSLT source, the user 240 can step into and debug these in the standalone case.

Figure 8:
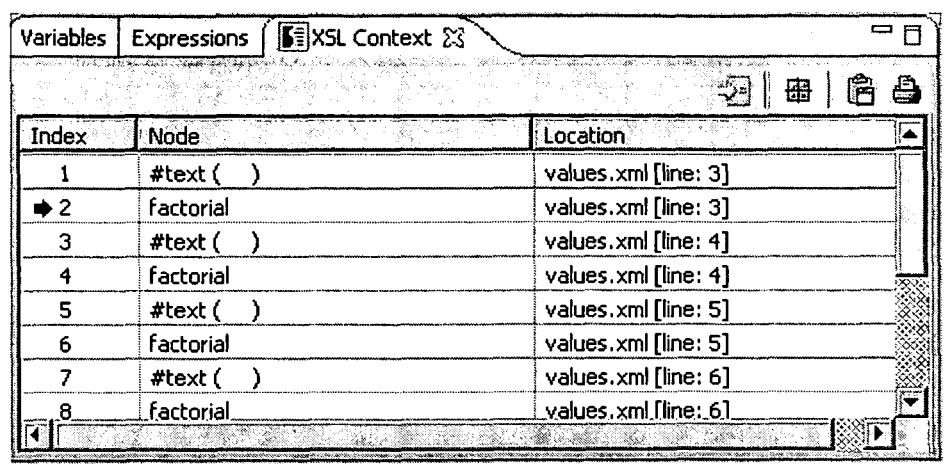
FIG. 8 depicts an XSLT context view provided by a debug user interface in accordance with an embodiment of the present invention.

The XSLT context view 224 allows the user 240 to see the current node and the current node list (see XSL Transformations (XSLT) Specification Version 1.0—Introduction for an explanation of "current node" and "current node list"). As illustrated in FIG. 8, for example, the XSLT context view 224 shows the current node list and an arrow which points to the current node. User 240 can select nodes in the current node list to show the source for the node in the editor view (not shown). This view gives the user a much better understanding of what the XSLT processor 214 is actually doing (e.g., users can see the node that is currently being processed and the nodes that will be processed next).

User 240 can evaluate XPath expressions in the context of the current suspend state. They can evaluate expressions which use currently visible variables and are based on the current node. As the user 240 steps and the context changes, the expressions are re-evaluated so the user 240 can see the changes.

The debug UI 202 supports the Xalan "Redirect" extension by providing a tabbed transform output view 225 (see FIG. 6) which shows all of the output files generated for a transform. The output files are updated as the user steps through the XSL transform giving the user 240 the a complete view of what is happening as they debug.

Figure 9:
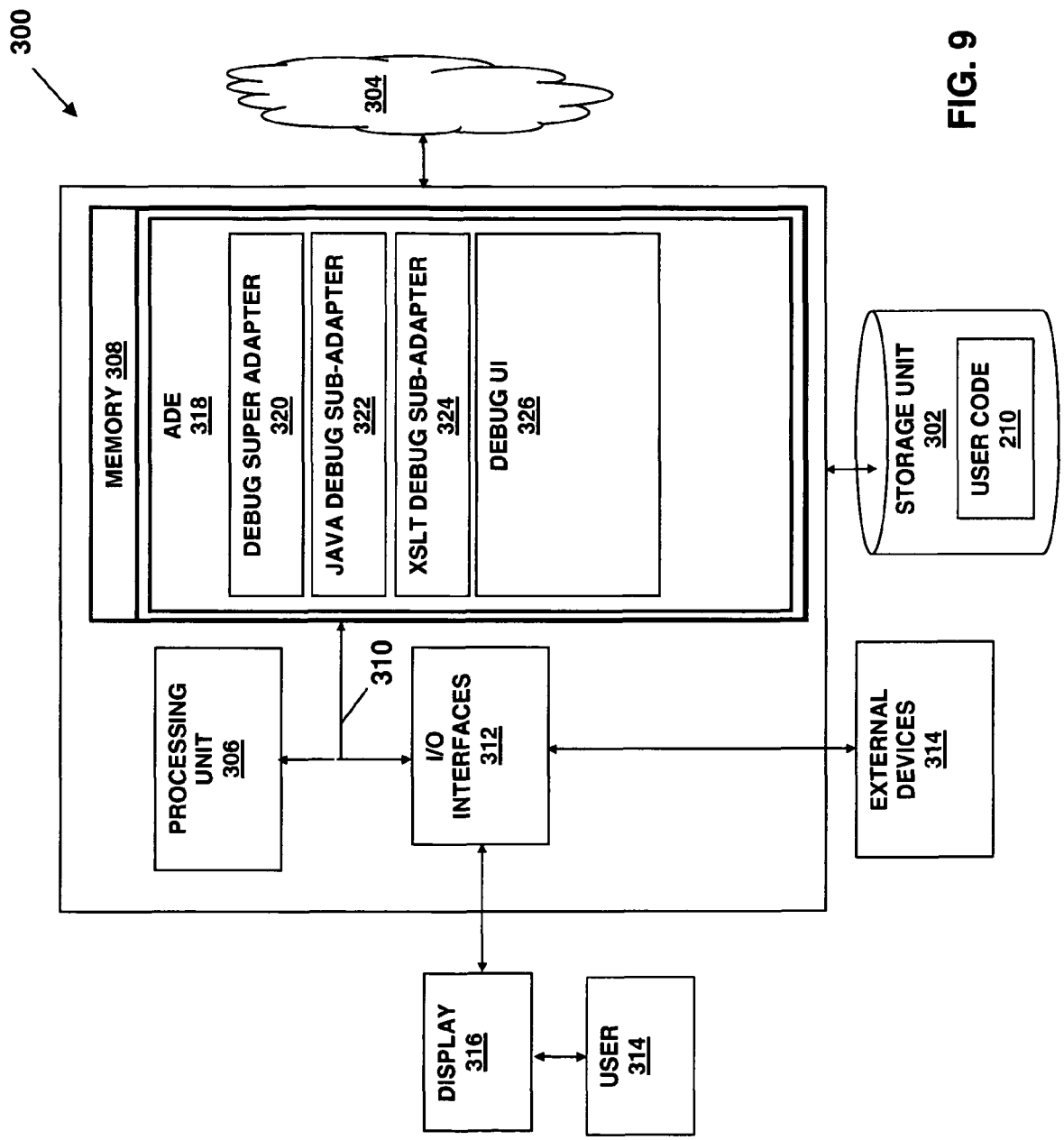
FIG. 9 depicts a computer system for implementing the present invention.
Figure 10:
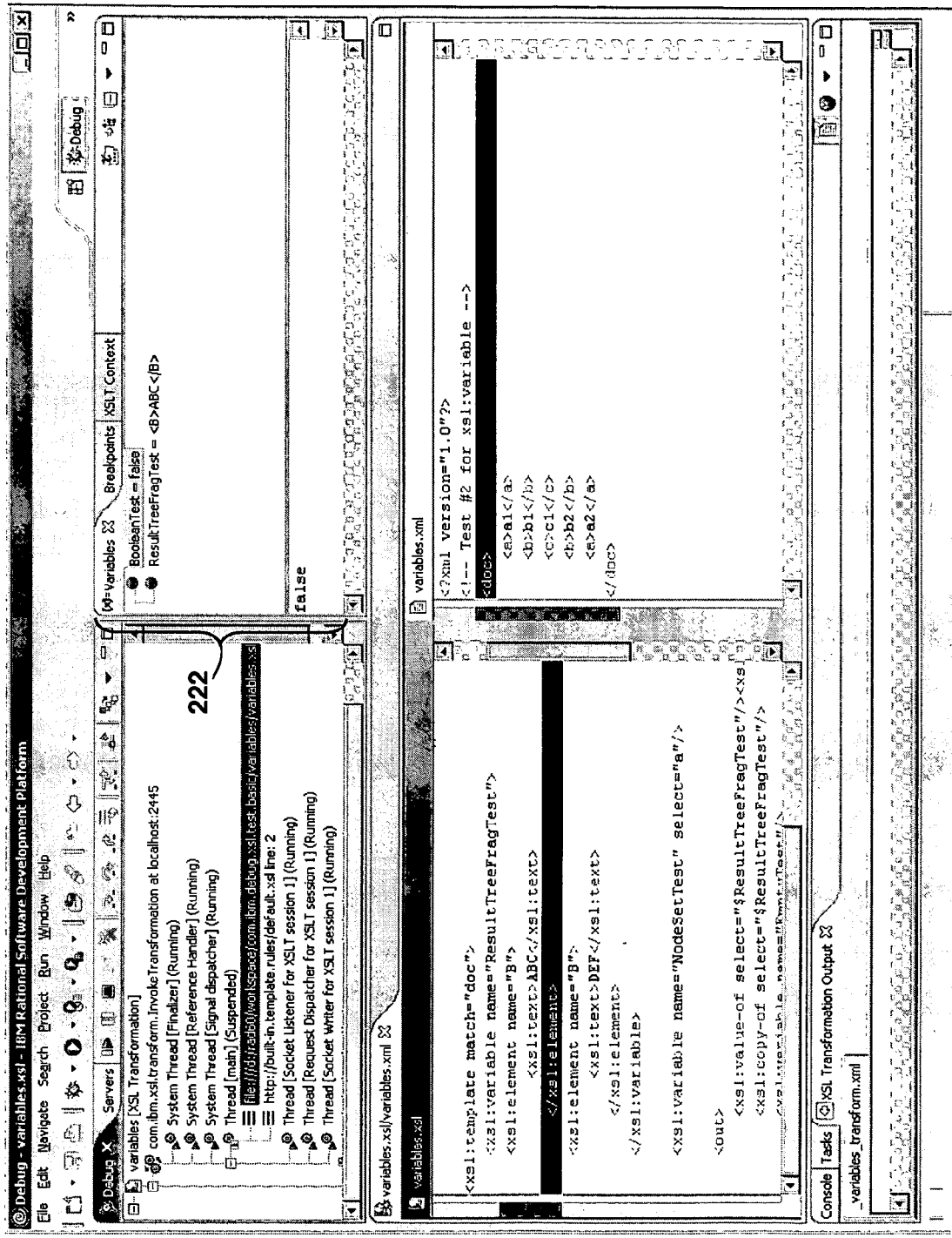
FIGS. 10-11 depict additional views of the debug user interface in accordance with the present invention.
Figure 11:
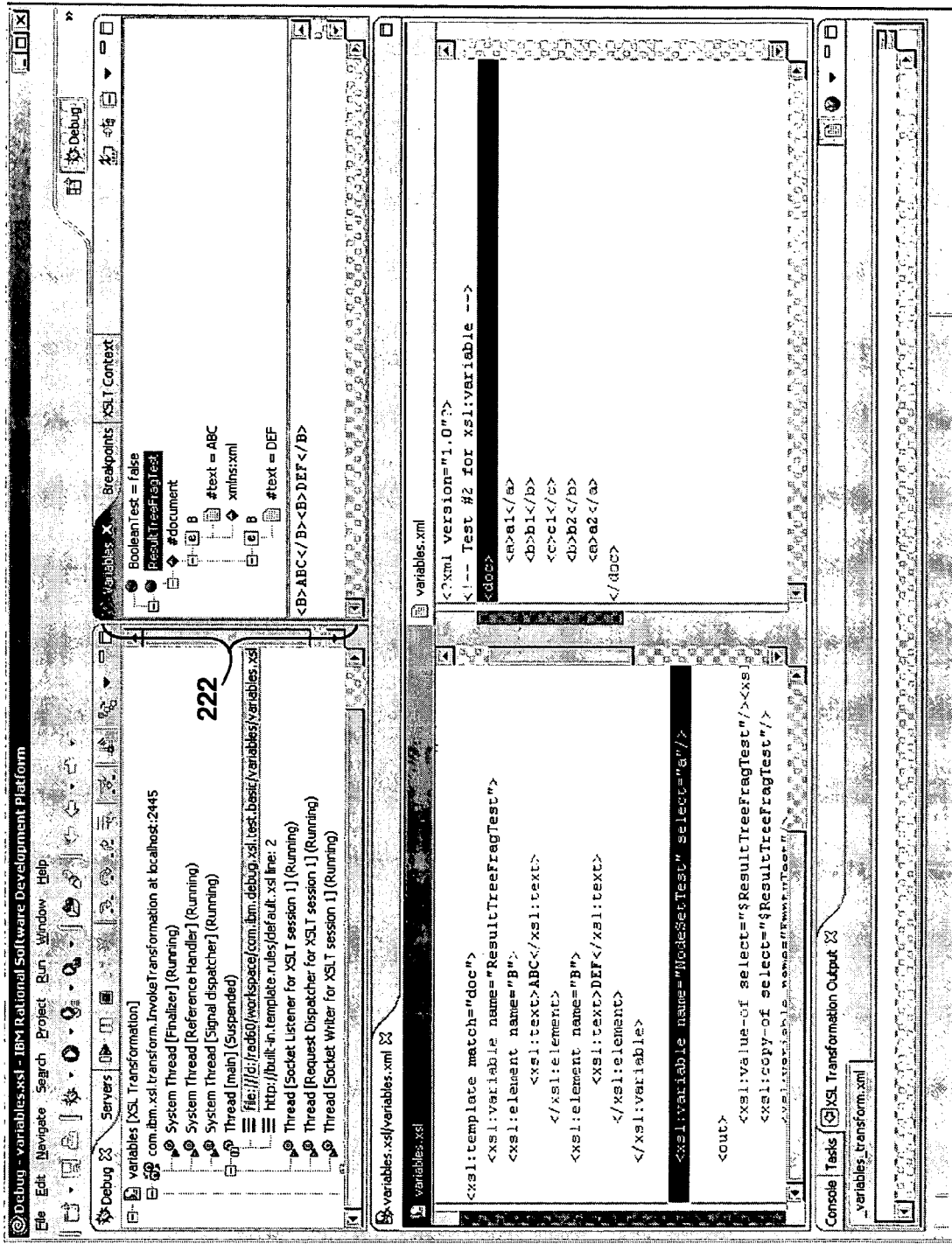

Referring now to FIG. 9, there is illustrated a computer system 300 for implementing an application development environment (ADE) in accordance with the present invention. Computer system 300 is intended to represent any type of computerized system capable of implementing the methods of the present invention.

Data (e.g., user code 210) and other information required to practice the present invention can be stored locally to computer system 300 (e.g., in a storage unit 302), and/or may be provided over a network 304. Storage unit 302 can comprise any system capable of providing storage for data and information under the present invention. As such, storage unit 302 may reside at a single physical location, comprising one or more types of data storage, or may be distributed across a plurality of physical systems in various forms. In another embodiment, each storage unit 302 may be distributed across, for example, a local area network (LAN), wide area network (WAN) or a storage area network (SAN) (not shown).

Network 304 is intended to represent any type of network over which data can be transmitted. For example, network 304 can include the Internet, a wide area network (WAN), a local area network (LAN), a virtual private network (VPN), a WiFi network, a personal area network (PAN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 300 generally includes a processing unit 306, memory 308, bus 310, input/output (I/O) interfaces 312 and external devices/resources 314. Processing unit 306 may comprise a single processing unit, or may be distributed across one or more processing units in one or more locations, e.g., on a client and server. Memory 308 may comprise any known type of data storage and/or transmission media, including magnetic media, optical media, random access memory (RAM), read-only memory (ROM), etc. Moreover, similar to processing unit 306, memory 308 may reside at a single physical location, comprising one or more types of data storage, or be distributed across a plurality of physical systems in various forms.

I/O interfaces 312 may comprise any system for exchanging information to/from an external source. External devices/resources 314 may comprise any known type of external device, including display 316, speakers, a CRT, LED screen, handheld device, keyboard, mouse, voice recognition system, speech output system, printer, monitor/display, facsimile, pager, etc.

Bus 310 provides a communication link between each of the components in computer system 300, and likewise may comprise any known type of transmission link, including electrical, optical, wireless, etc. In addition, although not shown, other components, such as cache memory, communication systems, system software, etc., may be incorporated into computer system 300.

Shown in memory 308 is ADE 318 in accordance with an embodiment of the present invention, which may be provided as a computer program product. ADE 318 operates as described above with regard to ADE 200. ADE 318 includes a debug super adapter 320, a plurality of debug sub-adapters (in this example a JVM debug sub-adapter 322 and an XSLT debug sub-adapter 324), and a debug UI 326. Debug UI 326 includes a debug event manager 328. Other components of ADE 318 such as registered event filters and listeners are also present but not shown for clarity. A JVM 330 is also provided in memory 308. Running within JVM 330 are an XSLT processor and XSLT debug engine (not shown). ADE 318 operates as described above.

It should be appreciated that the teachings of the present invention can be offered as a business method on a subscription or fee basis. For example, the application development environment 200 could be created, maintained, supported, and/or deployed by a service provider that offers the functions described herein for customers. That is, a service provider could be used to provide the debugging capabilities of the application development environment 200, as describe above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for debugging of mixed Java and Extensible Stylesheet Language Transform (XSLT) code, comprising:
    sending debug events from a Java debug sub-adapter and a XSLT debug sub-adapter to a debug super adapter filtering the debug events received from the Java and XSLT debug sub-adapters;
    generating debug events representing a consolidated view of the received debug events; and
    sending the debug events to a debug user interface (UI).

2. The method of claim 1, further comprising: seamlessly stepping between the Java and XSLT code.

3. The method of claim 1, further comprising: debugging dynamically generated XML source documents and XSLT stylesheets.

4. The method of claim 3, further comprising: generating source code from the dynamically generated XML source documents and XSLT stylesheets.

5. The method of claim 1, wherein the debug UI provides a merged stack trace comprising Java and XSLT stack frames in a single view.

6. The method of claim 5, further comprising: selecting a stack frame in the merged stack trace; and viewing associated variables and source of the stack frame.

7. The method of claim 5, further comprising displaying selected Java and XSLT stack frames.

8. The method of claim 5, further comprising mapping an underlying stack structure and hiding details of underlying processes.

9. The method of claim 1, wherein the mixed Java and XSLT code comprises a servlet that calls a plurality of XSL transformations, the method further comprising: debugging the servlet and plurality of XSL transformation in real time in a single debug session.

10. A method of debugging an Extensible Stylesheet Language (XSL) transformation in real time, said method comprising:
    in a processor executing a Java Virtual Machine configured to implement an XSLT processor, receiving debug events from both a Java debug sub-adapter and an XSLT debug sub-adapter;
    with said processor, filtering said received debug events and generating new debug events representing a consolidated view of said received debug events; and
    presenting said new debug events to a user through a user interface to said processor.

11. The method of claim 10, wherein the XSL transformation is called by Java code, the method further comprising: seamlessly stepping through the XSL transformation and the Java code while debugging.

12. The method of claim 11, further comprising: displaying a merged stack trace comprising Java and XSLT stack frames in a single view while debugging.

13. The method of claim 12, further comprising displaying selected Java and XSLT stack frames.

14. The method of claim 12, further comprising mapping an underlying stack structure and hiding details of underlying processes.

15. A system for debugging of mixed Java and Extensible Stylesheet Language Transform (XSLT) code, comprising:
    a physical XSLT device comprising at least one processor configured to implement a Java Virtual Machine based XSLT processor and an application development environment;
    wherein said application development environment comprises:
        a Java debug sub-adapter and an XSLT sub-adapter; a debug super adapter for receiving debug events sent from the Java and XSLT debug sub-adapters, wherein the debug super adapter filters the debug events received from the Java and XSLT debug sub-adapters and generates debug events representing a consolidated view of the received debug events; and
        a debug user interface (UI) for receiving the debug events generated by the debug super adapter.

16. The system of claim 15, further comprising: a merged stack trace in the debug UI comprising Java and XSLT stack frames in a single view.

17. The system of claim 16, further comprising: a system for selecting a stack frame in the merged stack trace, wherein the debug UI displays associated variables and source of the stack frame.

18. The system of claim 17, wherein the merged stack trace displays selected Java and XSLT stack frames.

19. The system of claim 17, wherein the merged stack trace maps an underlying stack structure, while hiding details of underlying processes.

20. A computer program product for debugging of mixed Java and Extensible Stylesheet Language Transform (XSLT) code, the computer program product comprising:
    a non-transitory physical computer usable medium having computer useable program code embodied therein, the computer useable program code comprising: computer usable program code configured to send debug events from a Java debug sub-adapter and a XSLT debug sub-adapters to a debug super adapter;

computer usable program code configured to filter the debug events received from the Java and XSLT debug sub-adapters;
computer usable program code configured to generate debug events representing a consolidated view of the received debug events; and computer usable program code configured to send the debug events to a debug user interface (UI).

\* \* \* \* \*